2 Sheets—Sheet 1.
H. L. McAVOY.
Assignor to D. L Bartlett & H. W Robbins.
FIRE-POT AND GRATE FOR FIRE-PLACE STOVES.
No. 7,550. Reissued March 6, 1877.
FIG. I
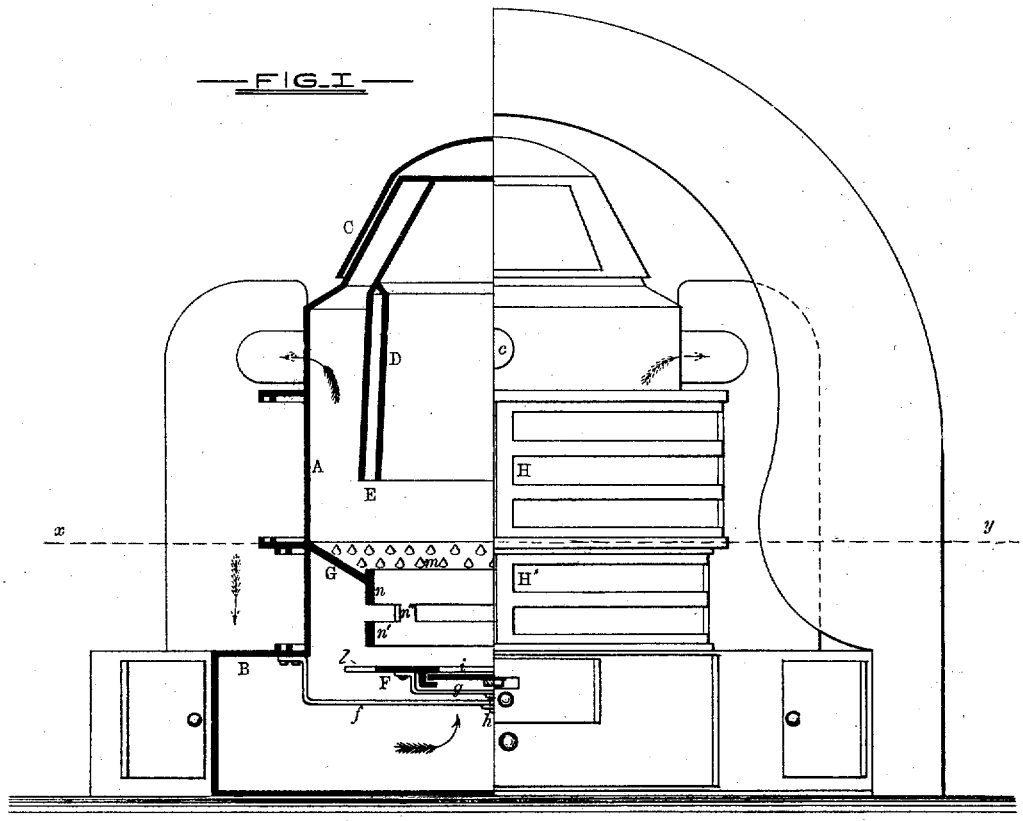
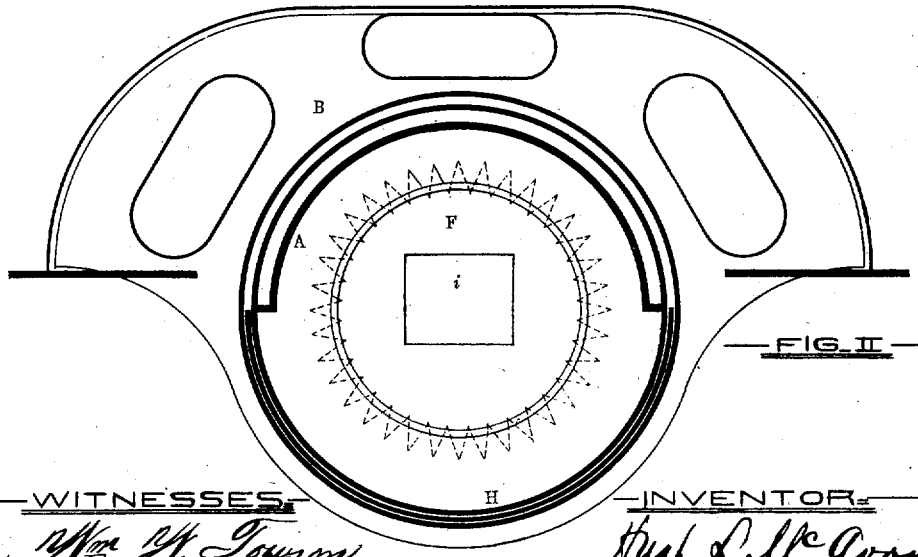
FIG. II
WITNESSES.
Wm H. Towson
Alex Scott
INVENTOR.
Hugh L. McAvoy
by G. H. & W. S. Howard
Attys
N. PETERS, PHOTO-LITHOGRAPHER, WASHINGTON, D. C.

2 Sheets—Sheet 2.
H. L. McAVOY.
Assignor to D. L Bartlett & H. W Robbins.
FIRE-POT AND GRATE FOR FIRE-PLACE STOVES.
No. 7,550. Reissued March 6, 1877.
FIG. III
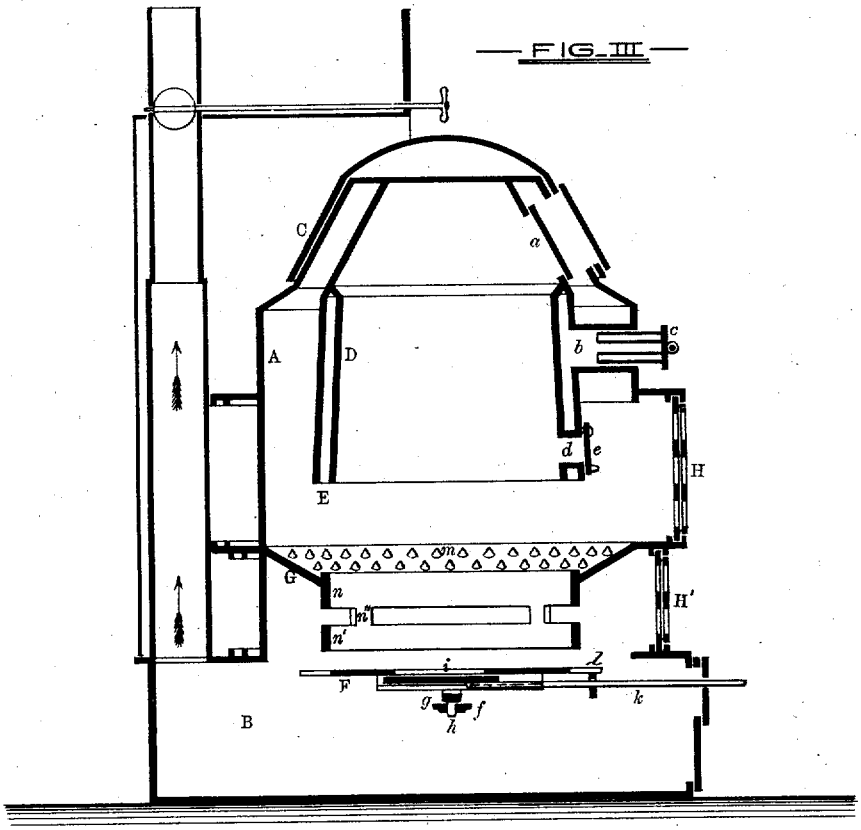
FIG. IV
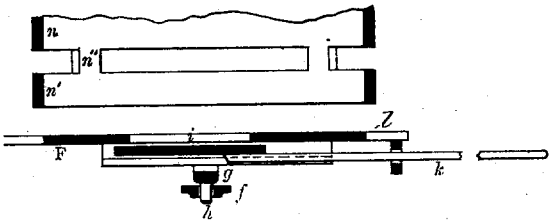
FIG. V
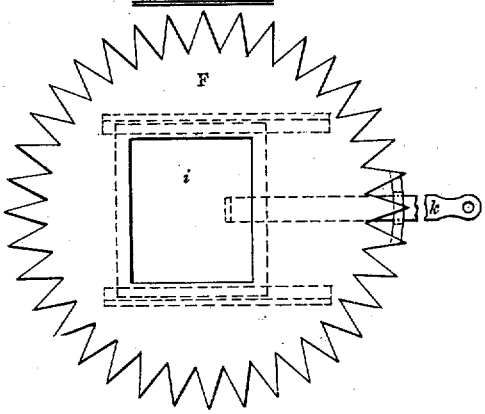
WITNESSES:
Wm W. Towson
Alex Scott
INVENTOR:
Hugh L. McAvoy,
by G. H. W. S. Howard
Attys
N. PETERS, PHOTO-LITHOGRAPHER, WASHINGTON, D. C.

UNITED STATES PATENT OFFICE.

HUGH L. McAVOY, OF BALTIMORE, MARYLAND, ASSIGNOR TO DAVID L. BARTLETT AND HORACE W. ROBBINS, OF SAME PLACE.

IMPROVEMENT IN FIRE-POTS AND GRATES FOR FIRE-PLACE STOVES.

Specification forming part of Letters Patent No. 173,317, dated February 8, 1876; reissue No. 7,550, dated March 6, 1877; application filed November 17, 1876.

*To all whom it may concern:*

Be it known that I, HUGH L. McAVOY, of the city of Baltimore and State of Maryland, have invented certain Improvement in Stoves, of which the following is a specification; and I do hereby declare that in the same is contained a full, clear, and exact description of my said invention, reference being had to the accompanying drawing, and to the letters of reference marked thereon.

My invention is more particularly adaptable to fire-place stoves; and relates, first, to an improved fire-plate, consisting of a plate fitted to be shaken circumferentially, having an internal opening covered by a sliding door, which fire-plate, when the said door is closed, is practically a solid or imperforate fire-bed. The employment of the fire-plate as a bed for the fire allows the base thereof to be readily examined, raked, or cleared around the edges or to its center; and also facilitates the expulsion of ashes when the fire-bed is shaken. Though, as stated, the fire-bed is, when closed, practically solid or imperforate, the fire-plate, for the purpose of increasing the draft-room, near the edges of the fire, and freeing the fire from ashes, is provided with air and ash passages at or near its periphery, portions of the fire-plate being removed for the said purpose, and the ashes, as they are thrown to the edges of the fire by the vibratory motion of the fire-plate, fall through the said ash-passages to the ash-pan below, and the edges of the fire are, in consequence, kept clear and bright.

By the use of the said fire-plate instead of a grate in any of its forms, less clinkers will be formed, as the current of air passes freely to the fire around the periphery of the grate-area, instead of being compelled to pass up into the center of the base of the fire through the contracted aperture ordinarily left in the center of the grate; for in the use of grates the ashes, when formed and thrown to the edges of the fire in the endeavor to dislodge them, for the want of adequate means of escape, necessarily cause the central area of the grate to be the only part sufficiently exposed to furnish draft room.

In still further carrying out my invention there is provided and combined with the fire-plate a fire-pot, which combination of parts gives freedom to the entrance of air to the base of the fire, an easy escape to the ashes at the bottom edges of the burning fuel, and insures the ready examination of the whole fire-bed, and the convenient removal of clinkers. This combination of elements forms the second part of my invention.

My invention, therefore, relates, secondly, to a vibratory fire-plate, having an internal opening and sliding door, and peripheral air and ash passages, as before stated, combined with a fire-pot, the lower end of which is placed adjacently to the said fire-plate, and having parts of its said lower portion removed, as draft and ash passages which coact with the air and ash passages of the fire-plate, the whole admitting air to the lower and outer edges, instead of to and through the center of the fire, and permitting the free escape of ashes when the fire-plate is vibrated.

My invention relates, thirdly, to improvements made in the bed for the fire-clay, consisting in providing, for the reception of the clay, when in a plastic state, a series of spines or projections upon the annular plate ordinarily laid with fire-brick, the said spines or projections embedding in the clay, and holding it, when in a baked condition firmly in position.

In the further description of my invention which follows, due reference must be had to the accompanying drawing, in which—

Figure 1 is a front elevation of a stove embodying my improvements, partly in section. Fig. 2 is a sectional plan of the same upon *x y*. Fig. 3 is a vertical side section of the same. Fig. 4 is an enlarged vertical section of the fire-plate, sliding door, and lower end of the fire-pot. Fig. 5 is a plan of Fig. 4.

Similar letters of reference indicate similar parts of the invention in all the views.

A designates the cylinder or stove proper, fastened to the hollow base B. The upper end of the cylinder is conical in form, and provided with a closely-fitting revoluble cover, C, having mica-covered slots, and a door. D indicates the magazine, secured to the inner parts of the cylinder. The lower portion of the magazine is nearly cylindrical in shape, being slightly tapered, the lower diameter being the larger.

This construction of the magazine facilitates the loosening of the fuel accumulated at its lower end upon the insertion and use of the poker.

The upper end of the magazine is inclosed within the conically-formed part of the stove proper, and is made to conform nearly to its shape. The magazine is provided with a door, *a*, for feeding purposes.

E is an annular space or air-chamber formed in the wall of the magazine to conduct heated air to the burning fuel through the pipe *b*, reaching to the front of the stove, and provided with a damper or register, *c*. The hole for the insertion of the poker is represented by *d*, and when not in use is covered by the adjustable door *e*.

F is the fire-plate, upon which the fire is sustained. The fire-plate F is pivoted centrally on the cross-bar *f* by means of the yoke *g* and pin *h*, and may be moved or shaken circumferentially to expel the accumulated ashes. The solid sliding door, before referred to, and shown by *i*, covers an internal opening in the fire-plate, and is withdrawn and replaced by means of the bar *k* attached to the door, which bar is also the medium employed in shaking the fire-plate F. The opening in the fire-plate, when the sliding door is withdrawn, allows the clinkers to pass from the base of the fire to the ash-pan below. The fire-plate F is provided with the peripheral air and ash passages or openings *l*, before alluded to. The said passages are here obtained by the removal of portions of the outer part of the plate, the openings being arranged radially and regularly, as shown.

G is an annular plate, extending inward from the interior of the cylinder A, adapted to hold fire-clay, for which purpose it is provided with the spines or projections *m*, which embed themselves in the clay when placed upon the plate G in a plastic state. The plate G, with its lower attached part, forms the fire-pot. The lower part of the fire-pot, as before stated, is designed to co-operate, with respect to the admission of air to the base of the fire, and the escape of ashes therefrom, with the fire-plate F, having the peripheral openings for that purpose; and to enable the fire-pot to so coact its lower part is constructed to form a perforated cylinder, the perforations being the required air and ash passages. The perforations are seen to be embraced between the upper and lower rings *n n′*, and the vertical pieces *n″* connecting the said rings. This special mode of giving to the fire-pot the requisite draft and ash openings is found, while affording great lateral draft-room and ash way, to give also the greatest possible diameter and area to the receptacle for fuel over the movable grate, formed by the plate F and its appendages. The supporting-pieces *n″* between the rings also serve, while offering little obstruction to the draft, to preserve the shape of the fire not intended to be disturbed, when, by the shaking of the plate F, the dead fire is thrown out under the lower ring, and through the openings of said plate. H H′ are sliding doors, composed of horizontally-arranged bars, between which mica or other illuminating substance is inserted, designed to produce an agreeable illuminative effect. These doors are not claimed as a part of my present invention. The course of the products of combustion is indicated by the arrows.

I make no claim to the double magazine, although, for purposes of illustration and better understanding of my invention, it is herein described, and shown in the annexed drawing.

Having thus described my invention, what I claim as new, and wish to secure by Letters Patent of the United States, is—

1. As a fire-bed for stoves, a vibrating fire-plate, having an internal opening and solid sliding door to cover the same, substantially as herein specified.

2. A vibrating fire-plate, having an internal opening and solid sliding door to cover the same, and provided also with outer or peripheral ash and air passages, combined with and arranged in close proximity to a fire-pot having ash and air openings at or near its bottom, substantially as and for the purposes described.

3. The inclined annular plate or fire-pot G, provided with spines or projections *m*, in combination with the rings *n n′* and their connecting pieces, the rings having spaces between them, the whole being arranged over the movable grate, as specified.

In testimony whereof I have hereunto subscribed my name this 11th day of November, in the year of our Lord 1876.

HUGH L. McAVOY.

Witnesses:

GEORGE H. HOWARD,

THOS. MURDOCH.